(12) United States Patent
Bowering et al.

(10) Patent No.: US 7,465,946 B2
(45) Date of Patent: Dec. 16, 2008

(54) ALTERNATIVE FUELS FOR EUV LIGHT SOURCE

(75) Inventors: Norbert R. Bowering, San Diego, CA (US); Oleh V. Khodykin, San Diego, CA (US); Alexander N. Bykanov, San Diego, CA (US); Igor V. Fomenkov, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 284 days.

(21) Appl. No.: 11/406,216

(22) Filed: Apr. 17, 2006

(65) Prior Publication Data

US 2006/0249699 A1     Nov. 9, 2006

Related U.S. Application Data

(63) Continuation-in-part of application No. 11/174,442, filed on Jun. 29, 2005, now Pat. No. 7,196,342, which is a continuation of application No. 10/900,839, filed on Jul. 27, 2004, now Pat. No. 7,164,144, and a continuation-in-part of application No. 10/803,526, filed on Mar. 17, 2004, now Pat. No. 7,087,914, and a continuation-in-part of application No. 10/798,740, filed on Mar. 10, 2004, now Pat. No. 7,217,940.

(51) Int. Cl.
 - *A61N 5/06* (2006.01)
 - *G01J 3/10* (2006.01)
 - *H05G 2/00* (2006.01)

(52) U.S. Cl. .............. 250/504 R; 250/504 H; 250/423 R; 250/424; 250/492.1; 250/492.2; 250/493.1; 250/505.1; 216/63; 134/1.1; 156/345.46

(58) Field of Classification Search ............ 250/504 R, 250/504 H, 423 R, 424, 492.1, 492.2, 493.1, 250/505.1; 378/119; 216/63; 134/1.1; 156/345.46
See application file for complete search history.

(56) References Cited

U.S. PATENT DOCUMENTS 2,759,106 A     8/1956     Wolter .................. 250/50

(Continued)

FOREIGN PATENT DOCUMENTS

| JP | 06-053594 | 2/1994 |
| JP | 2000-058944 | 2/2000 |
| JP | 200091096 | 3/2000 |
| WO | WO2004/104707 | 12/2004 |

OTHER PUBLICATIONS

U.S. Appl. No. 11/174,299, filed Jun. 2005, Ershov et al.
U.S. Appl. No. 11/067,124, filed Feb. 2005, Algots et al.
U.S. Appl. No. 11/174,443, filed Jun. 2005, Bykanov et al.
U.S. Appl. No. 11/358,983, filed Feb. 2005, Bykanov et al.
U.S. Appl. No. 11/358,988, filed Feb. 2006, Bykanov et al.
Andreev et al., "Enhancement of laser/EUV conversion by shaped laser pulse interacting with Li-contained targets for EUV lithography," *Proc. of SPIE* 5196:128-136 (2004).

(Continued)

*Primary Examiner*—Jack I. Berman
*Assistant Examiner*—Meenakshi S Sahu
(74) *Attorney, Agent, or Firm*—Matthew K. Hillman (57) ABSTRACT

An EUV light source is disclosed which may comprise at least one optical element having a surface, such as a multi-layer collector mirror; a laser source generating a laser beam; and a source material irradiated by the laser beam to form a plasma and emit EUV light. In one aspect, the source material may consist essentially of a tin compound and may generate tin debris by plasma formation which deposits on the optical element and, in addition, the tin compound may include an element that is effective in etching deposited tin from the optical element surface. Tin compounds may include $SnBr_4$, $SnBr_2$ and $SnH_4$. In another aspect, an EUV light source may comprise a molten source material irradiated by a laser beam to form a plasma and emit EUV light, the source material comprising tin and at least one other metal, for example tin with Gallium and/or Indium.

32 Claims, 4 Drawing Sheets

U.S. PATENT DOCUMENTS

| | | | |
|---|---|---|---|
| 3,150,483 A | 9/1964 | Mayfield et al. | 60/35.5 |
| 3,232,046 A | 2/1966 | Meyer | 50/35.5 |
| 3,279,176 A | 10/1966 | Boden | 60/202 |
| 3,746,870 A | 7/1973 | Demarest | 250/227 |
| 3,960,473 A | 6/1976 | Harris | 425/467 |
| 3,961,197 A | 6/1976 | Dawson | 250/493 |
| 3,969,628 A | 7/1976 | Roberts et al. | 250/402 |
| 4,042,848 A | 8/1977 | Lee | 313/231.6 |
| 4,088,966 A | 5/1978 | Samis | 313/231.5 |
| 4,143,275 A | 3/1979 | Mallozzi et al. | 250/503 |
| 4,162,160 A | 7/1979 | Witter | 75/246 |
| 4,203,393 A | 5/1980 | Giardini | 123/30 |
| 4,223,279 A | 9/1980 | Bradford, Jr. et al. | 331/94.5 |
| 4,364,342 A | 12/1982 | Asik | 123/143 |
| 4,369,758 A | 1/1983 | Endo | 123/620 |
| 4,455,658 A | 6/1984 | Sutter et al. | 372/38 |
| 4,504,964 A | 3/1985 | Cartz et al. | 378/119 |
| 4,507,588 A | 3/1985 | Asmussen et al. | 315/39 |
| 4,534,035 A | 8/1985 | Long | 372/85 |
| 4,536,884 A | 8/1985 | Weiss et al. | 378/119 |
| 4,538,291 A | 8/1985 | Iwamatsu | 378/119 |
| 4,550,408 A | 10/1985 | Karning et al. | 372/58 |
| 4,561,406 A | 12/1985 | Ward | 123/536 |
| 4,596,030 A | 6/1986 | Herziger et al. | 378/119 |
| 4,618,971 A | 10/1986 | Weiss et al. | 378/34 |
| 4,626,193 A | 12/1986 | Gann | 431/74 |
| 4,633,492 A | 12/1986 | Weiss et al. | 378/119 |
| 4,635,282 A | 1/1987 | Okada et al. | 378/34 |
| 4,751,723 A | 6/1988 | Gupta et al. | 378/119 |
| 4,752,946 A | 6/1988 | Gupta et al. | 378/119 |
| 4,774,914 A | 10/1988 | Ward | 123/162 |
| 4,837,794 A | 6/1989 | Riordan et al. | 378/119 |
| 4,891,820 A | 1/1990 | Rando et al. | 372/93 |
| 4,928,020 A | 5/1990 | Birx et al. | 307/106 |
| 4,959,840 A | 9/1990 | Akins et al. | 372/57 |
| 5,005,180 A | 4/1991 | Edelman et al. | 372/57 |
| 5,023,884 A | 6/1991 | Akins et al. | 372/57 |
| 5,023,897 A | 6/1991 | Neff et al. | 378/122 |
| 5,025,445 A | 6/1991 | Anderson et al. | 372/20 |
| 5,025,446 A | 6/1991 | Kuizenga | 372/21 |
| 5,027,076 A | 6/1991 | Horsley et al. | 324/674 |
| 5,070,513 A | 12/1991 | Letardi | 372/83 |
| 5,102,776 A | 4/1992 | Hammer et al. | 430/311 |
| 5,126,638 A | 6/1992 | Dethlefsen | 315/326 |
| 5,142,166 A | 8/1992 | Birx | 307/419 |
| 5,175,755 A | 12/1992 | Kumakhov | 378/34 |
| 5,189,678 A | 2/1993 | Ball et al. | 372/28 |
| 5,313,481 A | 5/1994 | Cook et al. | 372/20 |
| 5,315,611 A | 5/1994 | Ball et al. | 372/56 |
| 5,319,695 A | 6/1994 | Itoh et al. | 378/84 |
| 5,359,620 A | 10/1994 | Akins | 372/58 |
| RE34,806 E | 12/1994 | Cann | 427/446 |
| 5,411,224 A | 5/1995 | Dearman et al. | 244/53 |
| 5,448,580 A | 9/1995 | Birx et al. | 372/38 |
| 5,471,965 A | 12/1995 | Kapich | 123/565 |
| 5,504,795 A | 4/1996 | McGeoch | 378/119 |
| 5,729,562 A | 3/1998 | Birx et al. | 372/38 |
| 5,763,930 A | 6/1998 | Partlo | 250/504 |
| 5,852,621 A | 12/1998 | Sandstrom | 372/25 |
| 5,856,991 A | 1/1999 | Ershov | 372/57 |
| 5,863,017 A | 1/1999 | Larson et al. | 248/176.1 |
| 5,866,871 A | 2/1999 | Birx | 219/121 |
| 5,936,988 A | 8/1999 | Partlo et al. | 372/38 |
| 5,953,360 A | 9/1999 | Vitruk et al. | 372/87 |
| 5,963,616 A | 10/1999 | Silfvast et al. | 378/122 |
| 5,978,394 A | 11/1999 | Newman et al. | 372/32 |
| 5,991,324 A | 11/1999 | Knowles et al. | 372/57 |
| 6,005,879 A | 12/1999 | Sandstrom et al. | 372/25 |
| 6,016,323 A | 1/2000 | Ness et al. | 372/38 |
| 6,016,325 A | 1/2000 | Ness et al. | 372/38 |
| 6,018,537 A | 1/2000 | Hofmann et al. | 372/25 |
| 6,028,880 A | 2/2000 | Carlesi et al. | 372/58 |
| 6,031,241 A | 2/2000 | Silfvast et al. | 250/504 |
| 6,039,850 A | 3/2000 | Schulz | 204/192.15 |
| 6,051,841 A | 4/2000 | Partlo | 250/504 |
| 6,064,072 A | 5/2000 | Partlo et al. | 250/504 |
| 6,067,311 A | 5/2000 | Morton et al. | 372/57 |
| 6,094,448 A | 7/2000 | Fomenkov et al. | 372/102 |
| 6,104,735 A | 8/2000 | Webb | 372/37 |
| 6,128,323 A | 10/2000 | Myers et al. | 372/38.1 |
| 6,151,346 A | 11/2000 | Partlo et al. | 372/38 |
| 6,151,349 A | 11/2000 | Gong et al. | 372/58 |
| 6,164,116 A | 12/2000 | Rice et al. | 73/1.72 |
| 6,172,324 B1 | 1/2001 | Birx | 219/121.57 |
| 6,192,064 B1 | 2/2001 | Algots et al. | 372/99 |
| 6,195,272 B1 | 2/2001 | Pascente | 363/21 |
| 6,208,674 B1 | 3/2001 | Webb et al. | 372/57 |
| 6,208,675 B1 | 3/2001 | Webb | 372/58 |
| 6,219,368 B1 | 4/2001 | Govorkov | 372/59 |
| 6,240,117 B1 | 5/2001 | Gong et al. | 372/58 |
| 6,285,743 B1 | 9/2001 | Kondo et al. | 378/119 |
| 6,304,630 B1 | 10/2001 | Bisschops et al. | 378/119 |
| 6,307,913 B1 | 10/2001 | Foster et al. | 378/34 |
| 6,359,922 B1 | 3/2002 | Partlo et al. | 372/58 |
| 6,370,174 B1 | 4/2002 | Onkels et al. | 372/38.04 |
| 6,377,651 B1 | 4/2002 | Richardson et al. | 378/34 |
| 6,381,257 B1 | 4/2002 | Ershov et al. | 372/57 |
| 6,392,743 B1 | 5/2002 | Zambon et al. | 355/69 |
| 6,396,900 B1 | 5/2002 | Barbee, Jr. et al. | 378/84 |
| 6,404,784 B2 | 6/2002 | Komine | 372/9 |
| 6,414,979 B2 | 7/2002 | Ujazdowski et al. | 372/87 |
| 6,442,181 B1 | 8/2002 | Oliver et al. | 372/25 |
| 6,452,194 B2 | 9/2002 | Bijkerk et al. | 250/492.2 |
| 6,452,199 B1 | 9/2002 | Partlo et al. | 250/504 |
| 6,466,602 B1 | 10/2002 | Fleurov et al. | 372/87 |
| 6,477,193 B2 | 11/2002 | Oliver et al. | 372/58 |
| 6,493,323 B1 | 12/2002 | Bisschops et al. | 378/119 |
| 6,493,374 B1 | 12/2002 | Fomenkov et al. | 372/102 |
| 6,529,531 B1 | 3/2003 | Everage et al. | 372/20 |
| 6,532,247 B2 | 3/2003 | Spangler et al. | 372/61 |
| 6,535,531 B1 | 3/2003 | Smith et al. | 372/25 |
| 6,538,257 B2 | 3/2003 | Bisschops | 250/493.1 |
| 6,538,737 B2 | 3/2003 | Sandstrom et al. | 356/334 |
| 6,541,786 B1 | 4/2003 | Partlo et al. | 250/504 |
| 6,549,551 B2 | 4/2003 | Partlo et al. | 372/38.07 |
| 6,566,667 B1 | 5/2003 | Partlo et al. | 250/504 |
| 6,566,668 B2 | 5/2003 | Rauch et al. | 250/504 |
| 6,567,450 B2 | 5/2003 | Myers et al. | 372/55 |
| 6,576,912 B2 | 6/2003 | Visser et al. | 250/492.2 |
| 6,584,132 B2 | 6/2003 | Morton | 372/57 |
| 6,586,757 B2 | 7/2003 | Melnychuk et al. | 250/504 |
| 6,590,922 B2 | 7/2003 | Onkels et al. | 372/57 |
| 6,590,959 B2 | 7/2003 | Kandaka et al. | 378/119 |
| 6,618,421 B2 | 9/2003 | Das et al. | 372/55 |
| 6,621,846 B1 | 9/2003 | Sandstrom et al. | 372/57 |
| 6,625,191 B2 | 9/2003 | Knowles et al. | 372/55 |
| 6,647,086 B2 | 11/2003 | Amemiya et al. | 378/34 |
| 6,671,294 B2 | 12/2003 | Kroyan et al. | 372/20 |
| 6,721,340 B1 | 4/2004 | Fomenkov et al. | 372/25 |
| 6,744,060 B2 | 6/2004 | Ness et al. | 315/111.01 |
| 6,757,316 B2 | 6/2004 | Newman et al. | 372/57 |
| 6,782,031 B1 | 8/2004 | Hofmann et al. | 372/90 |
| 6,795,474 B2 | 9/2004 | Partlo et al. | 372/57 |
| 6,804,327 B2 | 10/2004 | Schriever et al. | 378/119 |
| 6,815,700 B2 | 11/2004 | Melnychuk et al. | 250/504 |
| 6,822,251 B1 | 11/2004 | Arenberg et al. | 250/504 |
| 6,831,963 B2 | 12/2004 | Richardson | 378/119 |
| 6,865,255 B2 | 3/2005 | Richardson | 378/119 |
| 6,894,298 B2 | 5/2005 | Ahmad et al. | 250/504 |
| 6,904,073 B2 | 6/2005 | Yager et al. | 372/57 |
| 6,984,941 B2 | 1/2006 | Hiramoto et al. | 315/111.01 |
| 6,985,508 B2 | 1/2006 | Knowles et al. | 372/55 |
| 2001/0006217 A1 | 7/2001 | Bisschops | 250/493.1 |
| 2002/0006149 A1 | 1/2002 | Spangler et al. | 372/61 |

| | | | | |
|---|---|---|---|---|
| 2002/0012376 A1 | 1/2002 | Das et al. | | 372/58 |
| 2002/0105994 A1 | 8/2002 | Partlo et al. | | 372/57 |
| 2002/0114370 A1 | 8/2002 | Onkels et al. | | 372/55 |
| 2005/0167617 A1* | 8/2005 | Derra et al. | | 250/504 R |
| 2006/0163500 A1* | 7/2006 | Inoue et al. | | 250/493.1 |
| 2007/0040999 A1* | 2/2007 | Wilehlmus Van Herpen et al. | | 355/30 |

OTHER PUBLICATIONS

Apruzese, "X-ray laser reearch using z pinches," *Am. Inst. Of Phys.* 399-403 (1994).
Bollanti et al., "Compact three electrodes excimer laser IANUS for a POPA optical system," *SPIE Proc.* (2206) 144-153 (1994).
Bollanti et al., "Ianus the three-electrode excimer laser," *App. Phys. B (Lasers & Optics)* 66(4):401-406, (1998).
Braun et al., "Multi-component EUV multilayer Mirrors," *Proc. SPIE*, 5037:2-13 (2003).
Choi et al., "A $10^{13}$ A/s high energy density micro discharge radiation source," *B. Radiation Characteristics*, p. 287-290.
Choi et al., "Fast pulsed hollow cathode capillary discharge device," *Rev. of Sci. Instrum.* 69(9):3118-3122 (1998).
Choi et al., "Temporal development of hard and soft x-ray emission from a gas-puff Z pinch," *Rev. Sci. Instrum.* 57(8), pp. 2162-2164 (Aug. 1986).
Coutts et al., "High average power blue generation from a copper vapour laser pumped titanium sapphire laser", *Journal of Modern Optics*, vol. 45, No. 6, p. 1185-1197 (1998).
Derra et al., "Tin Deliver Systems For Gas Discharge Sources" presented at *SPIE EUV* (Feb. 2005).
Feigl et al., "Heat resistance of EUV multiplayer mirrors for long-time applications," *Microelectric Engineering*, 57-58:3-8 (2001).
Fomenkov et al., "Characterization of a 13.5 nm source for EUV lithography based on a dense plasma focus and lithium emission," *Sematech Intl. Workshop on EUV Lithography* (Oct. 1999).
Giordano et al., "Magnetic pulse compressor for prepulse discharge in spiker-sustainer excitati technique for XeC1 lasers," *Rev. Sci. Instrum* 65(8), pp. 2475-2481 (Aug. 1994).
Hansson et al., "Xenon liquid jet laser-plasma source for EUV lithography," *Emerging Lithographic Technologies IV, Proc. of SPIE*, vol. 3997:729-732 (2000).
Hercher, "Tunable single mode operation of gas lasers using intracavity tilted etalons," *Applied Optics*, vol. 8, No. 6, Jun. 1969, pp. 1103-1106.
Jahn, *Physics of Electric Propulsion*, McGraw-Hill Book Company, (Series in Missile and Space U.S.A.) Chap. 9, "Unsteady Electromagnetic Acceleration," p. 257 (1968).
Kato, "Electrode Lifetime in a plasma focus x-ray source," *J. Appl. Phys.* (33) Pt. 1, No. 8:4742-4744 (1991).
Kato et al., "Plasma focus x-ray source for lithography," *Am. Vac. Sci. Tech. B*. 6(1): 1950198 (1988).
Lebert et al., "Soft x-ray emission of laser-produced plasma using a low-debris cryogenic nitrogen target," *J. App. Phys.*, 84(6):3419-3421 (1998).
Lebert et al., "A gas dicharged based radiation source for EUV-lithography," *Intl. Conf. Micro and Nano-Engineering 98*(Sep. 22-24, 1998) Leuven, Belgium.
Lebert et al., "Investigation of pinch plasmas with plasma parameters promising ASE," *Inst. Phys. Conf. Ser No. 125 Section 9*, pp. 411-415 (1992) Schiersee, Germany.
Lebert et al., "Comparison of laser produced and gas discharge based EUV sources for different applications," *Intl. Conf. Micro- and Nano-Engineering 98*(Sep. 22-24, 1998) Leuven, Belgium.
Lee, "Production of dense plasmas in hypocycloidal pinch apparatus," *The Phys. of Fluids*, 20(2):313-321 (1977).
Lewis, "Status of collision-pumped x-ray lasers," *Am. Inst. Phys.* pp. 9-16 (1994).
Lowe, "Gas plasmas yield x-rays for lithography," *Electronics*, pp. 40-41 (Jan. 27, 1982).
Lu et al., Low-Melting-Temperature Metals For Possible Use As Primary Targets At A Muon Collider Source, *Princeton/µµ/97-3*, pp. 1-32 (May 13, 1997) (Revised Jun. 12, 1998).

Malmqvist et al., "Liquid-jet target for laser-plasma soft x-ray generation," *Am. Inst. Phys.* 67(12):4150-4153 (1996).
Mather, "Formation of a high-density deuterium plasma focus," *The Physics of Fluids*, 8(2), 366-377 (Feb. 1965).
Mather et al., "Stability of the dense plasma focus," *Phys. of Fluids* (12(11):2343-2347 (1969).
Matthews et al., "Plasma sources for x-ray lithography," *SPIE 333 Submicron Lithography*, pp. 136-139 (1982).
Maruyama et al., Characteristics of high-power excimer laser master oscillator power amplifier system for dye laser pumping, *Optics Communications*, vol. 87, No. 3, p. 105-108 (1992).
Mayo et al., "A magnetized coaxial source facility for the generation of energetic plasma flows," *Sci. Technol.* vol. 4, pp. 47-55 (1994).
Mayo et al., "Initial results on high enthalpy plasma generation in a magnetized coaxial source," *Fusion Tech* vol. 26:1221-1225 (1994).
Nilsen et al., "Analysis of resonantly photopumped Na-Ne x-ray laser scheme," *Am. Phys. Soc.* 44(7):4591-4597 (1991).
Orme et al., "Electrostatic charging and deflection of nonconventional droplet streams formed from capillary stream breakup," *Physics of Fluids*, 12(9):2224-2235, (Sep. 2000).
Orme et al., "Charged molten droplet deposition as a direct write technology," *MRS 2000 Spring Meeting*, san Francisco, (Apr. 2000).
Pant et al., "Behavior of expanding laser produced plasma in a magnetic field," *Physica Scripta*, T75:104-111, (1998).
Partlo et al., "EUV (13.5nm) light generation using a dense plasma focus device," *SPIE Proc. on Emerging Lithographic Technologies III*, vol. 3676, 846-858 (Mar. 1999).
Pearlman et al., "x-ray lithography using a pulsed plasma source," *J. Vac. Sci. Technol.*, pp. 1190-1193 (Nov./Dec. 1981).
Porter et al., "Demonstration of population inversion by resonant photopumping in a neon gas cell irradiated by a sodium Z pinch," *Phys. Rev. Let.*, 68(6): 796-799, (Feb. 1992).
Price, "X-ray microscopy using grazing incidence reflection optics," *Am. Inst. Phys.*, pp. 189-199 (1981).
Qi et al., "Fluorescence in Mg IX emission at 48.340 Å from Mg pinch plasmas photopumped by A1 XI line radiation at 48.338 Å," *The Am. Phys. Soc.*, 47(3):2253-2263 (Mar. 1993).
Scheuer et al., "A magnetically-nozzled, quasi-steady, multimegawatt, coaxial plasma thruster," *IEEE: Transactions on Plasma Science*, 22(6) (Dec. 1994).
Schriever et al., "Laser-produced lithium plasma as a narrow-band extended ultraviolet radiation source for photoelectron spectroscopy," *App. Optics*, 37(7):1243-1248, (Mar. 1998).
Schriever et al., "Narrowband laser produced extreme ultraviolet sources adapted to silicon/molybdenum multilayer optics," *J. of App. Phys.*, 83(9):4566-4571, (May 1998).
Shiloh et al., "Z pinch of a gas jet," *Physical Review Lett.*, 40(8), pp. 515-518 (Feb. 20, 1978).
Silfvast et al., "High-power plasma discharge source at 13.5 nm and 11.4 nm for EUV lithography," *SPIE*, vol. 3676:272-275 (Mar. 1999).
Silfvast et al., "Lithium hydride capillary discharge creates x-ray plasma at 13.5 nanometers," *Laser Focus World*, p. 13 (Mar. 1997).
Stallings et al., "Imploding argon plasma experiments," *Appl. Phys. Lett.*, 35(7), pp. 524-526 (Oct. 1, 1979).
Tada et al., "1-pm spectrally narrowed compact ArF excimer laser for microlithography", *Laser and Electro-Optics*, CLEO '96 , CThG4, p. 374 (1996).
Tillack et al., "Magnetic confinement of an expanding laser-produced plasma," UC San Diego, Center for Energy Research, *UCSD Report & Abramova—Tornado Trap*.
Wihein et al., "A slit grating spectrograph for quantitative soft x-ray spectroscopy," *Am. Ins.t of Phys. Rev. ofSci. Instrum.*, 70(3):1694-1699, (Mar. 1999).
Wu et al., "The vacuum spark and spherical pinch x-ray/EUV point sources," *SPIE, Conf. on Emerging Tech. III*, Santa Clara, CA vol. 3676:410-420, (Mar. 1999).
Yusheng et al., "Recent progress of "Heaven-One" high power KrF excimer laser system", *Laser and Electro-Optics*, CLEO '96, CTh4, p. 374 (1996).
Zombeck, "Astrphysical observations with high resolution x-ray telescope," *Am. Inst. Of Phys.* pp. 200-209, (1981).

* cited by examiner

ALTERNATIVE FUELS FOR EUV LIGHT SOURCE

CROSS-REFERENCE TO RELATED APPLICATIONS

The present application is a continuation-in-part application of U.S. patent application Ser. No. 11/174,442 entitled SYSTEMS AND METHODS FOR REDUCING THE INFLUENCE OF PLASMA-GENERATED DEBRIS ON THE INTERNAL COMPONENTS OF AN EUV LIGHT SOURCE which is a continuation-in-part of application of U.S. patent application Ser. No. 10/900,839, entitled EUV LIGHT SOURCE, filed on Jul. 27, 2004, and is a continuation-in-part of application of U.S. patent application Ser. No. 10/803,526, entitled HIGH REPETITION RATE LPP EUV LIGHT SOURCE, filed on Mar. 17, 2004, and is a continuation-in-part application of U.S. patent application Ser. No. 10/798,740, entitled COLLECTOR FOR EUV LIGHT, filed on Mar. 10, 2004, the disclosures of each of which are hereby incorporated by reference herein.

FIELD OF THE INVENTION

The present invention relates to extreme ultraviolet ("EUV") light generators providing EUV light from a plasma created from a source material and collected and directed to a focus for utilization outside of the EUV light source generation chamber, e.g., for semiconductor integrated circuit manufacturing photolithography e.g., at wavelengths of around 50 nm and below.

BACKGROUND OF THE INVENTION

Extreme ultraviolet ("EUV") light, e.g., electromagnetic radiation having wavelengths of around 50 nm or less (also sometimes referred to as soft x-rays), and including light at a wavelength of about 13.5 nm, can be used in photolithography processes to produce extremely small features in substrates, e.g., silicon wafers.

Methods to produce EUV light include, but are not necessarily limited to, converting a material into a plasma state that has an element, e.g., xenon, lithium or tin, indium, antimony, tellurium, aluminum, etc., with an emission line in the EUV range. In one such method, often termed laser produced plasma ("LPP") the required plasma can be produced by irradiating a target material, such as a droplet, stream or cluster of material having the required line-emitting element, with a laser beam.

Heretofore, various systems in which the line-emitting element is presented for irradiation/electric discharge have been disclosed. Many diverse forms and states have been attempted, to include, presenting the element in pure form, e.g. pure metal, presenting the element as a compound, e.g. a salt, or in a solution, e.g. dissolved in a solvent such as water. Moreover, systems have been disclosed in which the line-emitting substance is presented as a liquid, gas, vapor and/or solid and can be in the form of a droplet, stream, moving tape, aerosol, particles in a liquid stream, gas jet, etc.

In addition to the large variation in source materials/material forms described above, a plethora of techniques have been developed to create a plasma of the source material. For example, a number of discharge plasma production (DPP) techniques have been developed such as capillary discharge, z-pinch, dense plasma focus, electrodeless z-pinch, star-pinch, etc. In a similar manner, for laser produced plasma systems, there are a number of choices available such as laser type, wavelength, pulse energy, etc.

From the above discussion, it is apparent that there are a relatively large number of possible EUV light source configurations. With this in mind, a number of factors warrant consideration when designing an EUV light source, especially a light source intended for high volume, production photolithography. One such factor is conversion efficiency, C, which is typically defined as the ratio of output EUV power, B, to input power, A, (i.e. the power required to operate a drive laser or create a gas discharge), $C=B/A$. For at least some LPP setups, conversion efficiency is a function of the type of laser used, the nature of the line emitting element and the coupling between laser beam and target. This coupling, in turn, may depend on the composition of the target, with some target materials allowing deep penetration of the laser beam into the target resulting in relatively high conversion efficiency.

Another factor that is often considered when designing a high volume EUV light source is the generation and mitigation of debris which may damage EUV light source optics such as a laser input window, collector mirror and/or metrology equipment. Thus, for at least some source materials, the production of a plasma may also generate undesirable by-products in the plasma chamber (e.g. debris) which can potentially damage or reduce the operational efficiency of the various plasma chamber optical elements. This debris can include out-of-band photons, high energy ions and scattered debris from the plasma formation, e.g., atoms and/or clumps/microdroplets of source material. This debris may also include chamber material from secondary sputtering and for the case of electric discharge type systems, electrode material. For this reason, it is often desirable to employ one or more techniques to minimize the types, relative amounts and total amount of debris formed for a given EUV output power. When the target size, e.g. droplet diameter, and/or target makeup, e.g. chemistry, are chosen to minimize debris, the targets are sometimes referred to as so-called "mass limited" targets.

The high energy ions and/or source material debris may be damaging to the optical elements in a number of ways, including heating them, coating them with materials which reduce light transmission, penetrating into them and, e.g., damaging structural integrity and/or optical properties, e.g., the ability of a mirror to reflect light at such short wavelengths, corroding or eroding them and/or diffusing into them. Thus, debris reduction and/or suitable techniques to reduce the impact of debris may need to be considered in the design of a high volume EUV light source.

Another factor that may be considered when selecting a source material is the temperature at which the source material may need to be processed. For example, pure lithium and tin both have relatively high melting points, which in some cases may forbid their practical use in applications in which piezo-electric materials are employed to produce a uniform stream of source material droplets. Other factors that may influence the choice of a target material include the materials toxicity and the materials compatibility (e.g. corrosiveness, etc.) with the source material dispenser.

Specific examples of EUV light source configurations include U.S. Pat. No. 6,831,963 which discloses the use of tin bromides in solution and at room temperature to produce a debris-free EUV emission, and U.S. Patent application No. 2005/0167617 which discloses the use of tin bromides due to their higher vapor pressure as compared with pure tin, and primarily describes the use of tin halogenide vapor as a source material for a gas discharge EUV light source. Another example of EUV light source configuration is disclosed in an article by Guenther Derra et al., entitled, Tin Deliver Systems for Gas Discharge Sources, that was presented at an SPIE EUV source workshop on Feb. 27, 2005. In the Derra et al. article, the use of stannane gas ($SnH_4$) in a gas discharge EUV light source is disclosed. Also, PCT application WO2004/104707 to Zink et al. entitled, Method and Device for Cleaning at least One Optical Component, discloses an EUV irradiation device in which an optical component becomes contaminated due to an inorganic substance introduced by a radiation source and the device includes a supply device to introduce a reactant for the purpose of removing the deposits. WO2004/104707 discloses that the radiation source may include tin and the reactant may include a halogen or halogen compound. Still, despite these disclosures, a suitable light source configuration for high volume EUV lithography has yet to be developed.

With the above in mind, Applicants disclose a laser produced plasma EUV light source, and corresponding methods of use.

SUMMARY OF THE INVENTION

In a first aspect, an EUV light source is disclosed which may comprise at least one optical element having a surface, such as a multi-layer collector mirror; a laser source generating a laser beam; and a source material irradiated by the laser beam to form a plasma and emit EUV light. For this aspect, the source may consist essentially of a tin compound and may generate tin debris by plasma formation which deposits on the optical element and the tin compound may include an element that is effective in etching deposited tin from the optical element surface. Tin compounds may include $SnBr_4$, $SnBr_2$ and $SnH_4$.

In one embodiment, the EUV light source may comprise a heater to heat Tin that has deposited on the element surface to a temperature greater than 150° C. to increase a rate of chemical reaction between the deposited Tin and the etchant. For example, the heater may be an ohmic heater, a radiative heater, a radio-frequency heater and/or a microwave heater.

In another aspect, the EUV light source may comprise a droplet generator system creating droplets of the source material. In one particular embodiment, the droplet generator system may heat the source material to a temperature above room temperature, for example, the droplet generator system may heat $SnBr_4$ to a temperature above 35 degrees C. to generate droplets and/or may heat $SnBr_2$ to a temperature above 216 degrees C. to generate droplets. In another embodiment, the droplet generator system may cool the source material to a temperature below room temperature, for example, the droplet generator system may cool $SnH_4$ to a temperature below minus 52 degrees C. to generate droplets.

In one or more of the above described embodiments, the laser source may comprise a $CO_2$ laser source producing radiation having a wavelength of about 10.6 µm.

In one aspect of an embodiment, an EUV light source may comprise a source material comprising at least one tin bromide, a heater for heating the source material above the melting point of the tin bromide; and a $CO_2$ laser source generating a laser beam for irradiating the liquid source material to produce a plasma therefrom and emit EUV radiation. For example, the source material may comprise $SnBr_2$ or $SnBr_4$.

In another aspect, an EUV light source may comprise a source material comprising $SnH_4$, a cooling system for cooling the source material below the boiling point of $SnH_4$; and a $CO_2$ laser source generating a laser beam for irradiating the liquid source material to produce a plasma therefrom and emit EUV radiation.

In yet another aspect, an EUV light source may comprise a laser source generating a laser beam; and a molten source material irradiated by said laser beam to form a plasma and emit EUV light, said source material comprising tin and at least one other metal, the source material having a melting point lower than pure tin. For example, the molten source material may comprise tin with Gallium, Indium or Gallium and Indium. One such alloy has tin in the range of 13 to 19 percent by weight, Indium in the range of 19 to 25 percent by weight and Gallium in the range of 59 to 65 percent by weight. In one implementation, the source material melting point is lower than 150° C. and may be at or about room temperature.

In one aspect of an embodiment, the molten source material consists essentially of metals. Also, the molten source material may comprise a eutectic tin alloy. In one embodiment, the laser source may comprise a $CO_2$ laser source producing radiation having a wavelength of about 10.6 µm. In a particular embodiment, the EUV light source may further comprise at least one optical element having a surface, the light source may generate tin debris by plasma formation, and the light source may comprise an reactant supply source for providing a reactant effective in etching deposited tin from the surface. A heater may be provided to heat tin deposits on the element surface to a temperature greater than 150° C. to increase a rate of chemical reaction between the deposited tin and the reactant. The reactant may be selected from the group of reactants consisting of HBr, HI, $I_2$, $Br_2$, $Cl_2$, HCl, $H_2$ and combinations thereof.

DETAILED DESCRIPTION OF PREFERRED EMBODIMENTS

Figure 1:
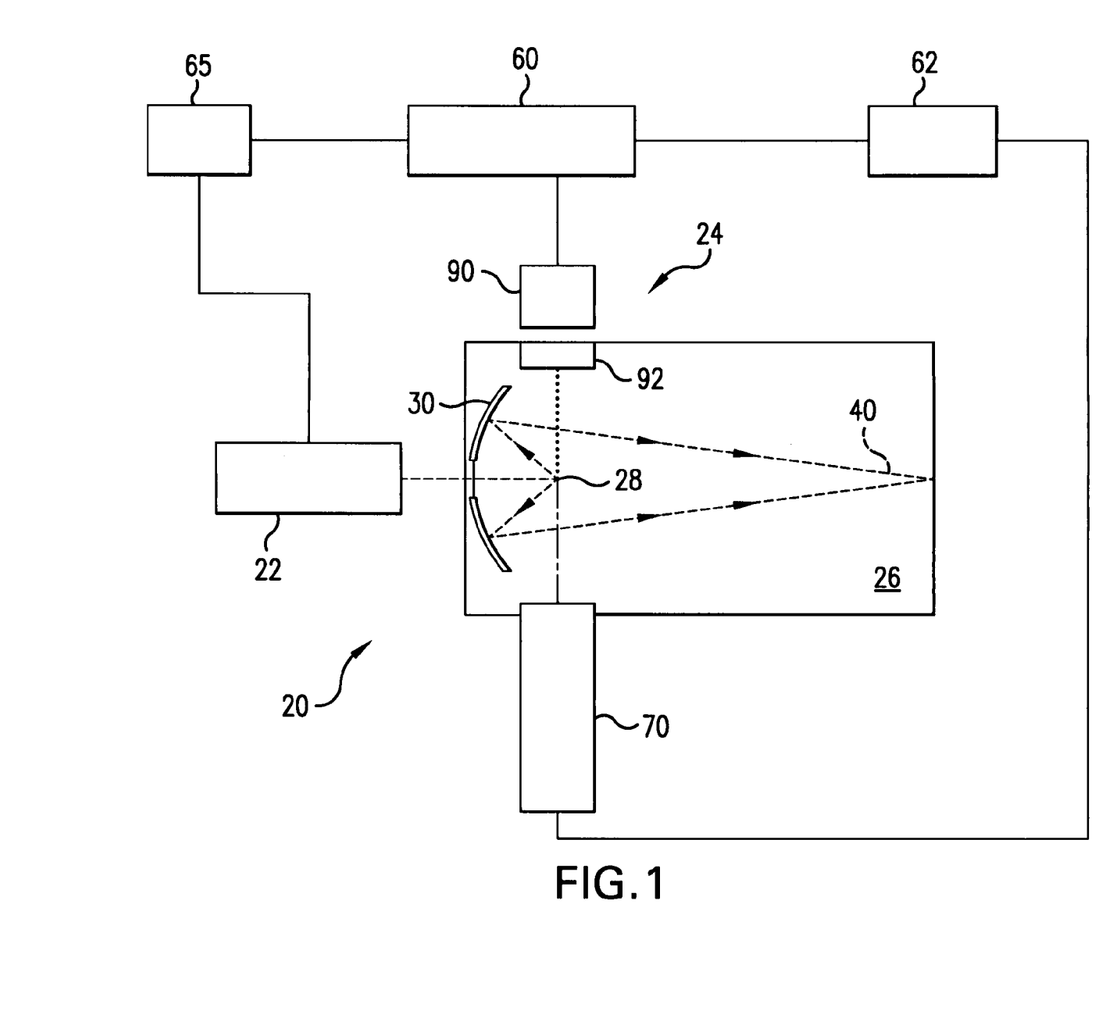
FIG. 1 shows a schematic, not to scale, view of an overall broad conception for a laser-produced plasma EUV light source according to an aspect of the present invention.

With initial reference to FIG. 1 there is shown a schematic view of an exemplary EUV light source, e.g., a laser produced plasma EUV light source 20 according to one aspect of an embodiment of the present invention. As shown, the LPP light source 20 may include a pulsed or continuous laser source 22, e.g., a pulsed gas discharge $CO_2$ laser source producing radiation at 10.6 µm, e.g. with DC or RF excitation operating at high power and high pulse repetition rate. For example, a suitable $CO_2$ laser source having a MO-PA1-PA2-PA3 configuration is disclosed in co-pending U.S. patent application Ser. No. 11/174,299 filed on Jun. 29, 2005, and entitled, LPP EUV LIGHT SOURCE DRIVE LASER SYSTEM, the entire contents of which are hereby incorporated by reference herein.

Depending on the application, other types of lasers may also be suitable. For example, a solid state laser, an excimer, a molecular fluorine laser, a MOPA configured excimer laser system, e.g., as shown in U.S. Pat. Nos. 6,625,191, 6,549,551, and 6,567,450, an excimer laser having a single chamber, an excimer laser having more than two chambers, e.g., an oscillator chamber and two amplifying chambers (with the amplifying chambers in parallel or in series), a master oscillator/power oscillator (MOPO) arrangement, a power oscillator/power amplifier (POPA) arrangement, or a solid state laser that seeds one or more $CO_2$, excimer or molecular fluorine amplifier or oscillator chambers, may be suitable. Other designs are possible.

The light source 20 may also include a target delivery system 24, e.g., delivering target(s), e.g. target(s) of a source material, e.g. $SnH_4$, $SnBr_2$, $SnBr_4$ or combinations thereof, in the form of liquid droplets or a continuous liquid stream. The target(s) may be delivered by the target delivery system 24, e.g., into the interior of a chamber 26 to an irradiation site 28 where the target will be irradiated and produce a plasma. In some cases, the targets may include an electrical charge allowing the targets to be selectively steered toward or away from the irradiation site 28.

Continuing with FIG. 1, the light source 20 may also include one or more optical elements such as a collector 30, e.g., a normal incidence reflector, e.g. a SiC substrate coated with a Mo/Si multilayer with additional thin barrier layers deposited at each interface to effectively block thermally-induced interlayer diffusion, in the form of a prolate ellipsoid, with an aperture to allow the laser light to pass through and reach the irradiation site 28. The collector 30 may be, e.g., in the shape of a ellipsoid that has a first focus at the irradiation site 28 and a second focus at a so-called intermediate point 40 (also called the intermediate focus 40) where the EUV light may be output from the light source 20 and input to, e.g., an integrated circuit lithography tool (not shown).

The light source 20 may also include an EUV light source controller system 60, which may also include a laser firing control system 65, along with, e.g., a laser beam positioning system (not shown). The light source 20 may also include a target position detection system which may include one or more droplet imagers 70 that provide an output indicative of the position of a target droplet, e.g., relative to the irradiation site 28 and provide this output to a target position detection feedback system 62, which can, e.g., compute a target position and trajectory, from which a target error can be computed, e.g. on a droplet by droplet basis or on average. The target error may then be provided as an input to the light source controller 60, which can, e.g., provide a laser position, direction and timing correction signal, e.g., to a laser beam positioning controller (not shown) that the laser beam positioning system can use, e.g., to control the laser timing circuit and/or to control a laser beam position and shaping system (not shown), e.g., to change the location and/or focal power of the laser beam focal spot within the chamber 26.

As shown in FIG. 1, the light source 20 may include a target delivery control system 90, operable in response to a signal (which in some implementations may include the target error described above, or some quantity derived therefrom) from the system controller 60, to e.g., modify the release point of the target droplets as released by the target delivery mechanism 92 to correct for errors in the target droplets arriving at the desired irradiation site 28.

Figure 2:
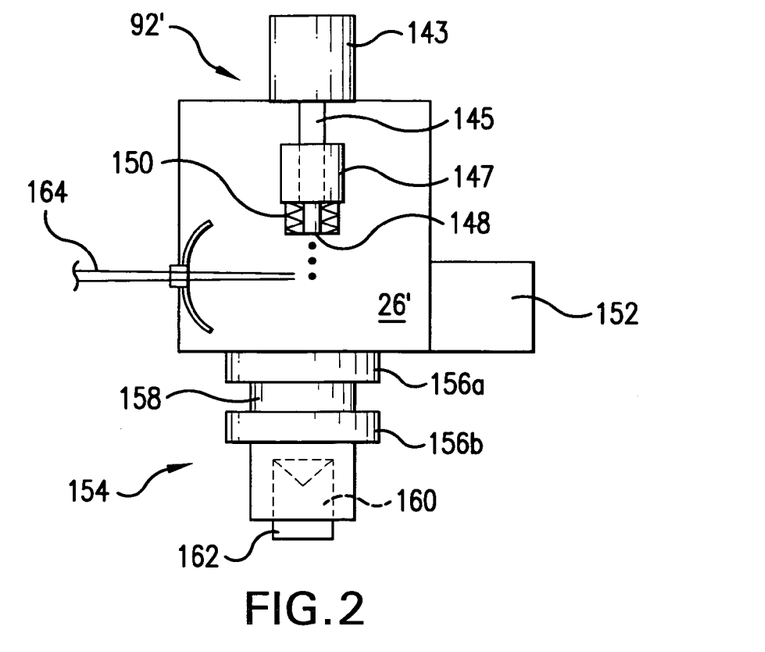
FIG. 2 shows a schematic, not to scale, view of a droplet generator system for creating droplets of a source material such as $SnBr_4$ and or $SnBr_2$.

FIG. 2 shows in greater detail a target delivery mechanism 92' for delivering target(s) of source material having, for example, liquid $SnBr_2$, $SnBr_4$ or combinations thereof, into a chamber 26' for irradiation therein to produce a plasma. For example, for liquid $SnBr_4$ which melts at about 31 degrees Celsius, the mechanism 92' may function to heat $SnBr_4$ to a range of about 35-45 degrees Celsius, and generate a stream of $SnBr_4$ droplets. When liquid $SnBr_2$ which melts at about 216 degrees Celsius is used, the mechanism 92' may function to heat $SnBr_2$ to a range of about 220-230 degrees Celsius, and generate a stream of $SnBr_2$ droplets For the specific embodiment shown in FIG. 2, the target delivery mechanism 92' may include a cartridge 143 holding a molten source material, e.g. tin bromide ($SnBr_2$ or $SnBr_4$), under pressure, e.g. using inert gas, e.g. Argon gas, to pass the source material through a set of filters 145 which may be for example, fifteen and seven microns, respectively, which trap solid inclusions, e.g. solid compounds like oxides, nitrides; metal impurities and so on, of seven microns and larger. From the filters 145, the source material may pass through an open/close thermal valve 147 to a dispenser 148. For example a Peltier device may be employed to establish the valve 147, freezing source material between the filters 145 and dispenser 148 to close the valve 147 and heating the frozen source material to open the valve 147.

For the mechanism 92', one or more modulating or non-modulating source material dispenser(s) 148 may be used. For example, a modulating dispenser may be used having a capillary tube formed with an orifice. The dispenser 148 may include one or more electro-actuatable elements, e.g. actuators made of a piezoelectric material, which can be selectively expanded or contracted to deform the capillary tube and modulate a release of source material from the dispenser 148. A heater 150 may be used to maintain the source material in a molten state while passing through the dispenser 148. Examples of modulating droplet dispensers can be found in co-pending U.S. patent application Ser. No. 11/067,124 filed on Feb. 25, 2005, entitled METHOD AND APPARATUS FOR EUV PLASMA SOURCE TARGET DELIVERY, co-pending U.S. patent application Ser. No. 11/174,443 filed on Jun. 29, 2005, entitled LPP EUV PLASMA SOURCE MATERIAL TARGET DELIVERY SYSTEM, co-pending U.S. patent application Ser. No. 11/174,443 filed on Feb. 21, 2006, and entitled, SOURCE MATERIAL DISPENSER FOR EUV LIGHT SOURCE, the entire contents of each of which are hereby incorporated by reference herein. An example of non-modulating droplet dispenser can be found in co-pending U.S. patent application Ser. No. 11/358,983 filed on Feb. 21, 2006, and entitled, LASER PRODUCED PLASMA EUV LIGHT SOURCE WITH PRE-PULSE, the entire contents of each of which are hereby incorporated by reference herein.

For the arrangement shown in FIG. 2, the chamber 26' may be heated to a temperature of about 100 degrees Celsius, including all inside components such as pumps, pump lines up to a scrubber (not shown), which can be used to scrub bromide gases. As shown, a differentially pumped and gate valve isolated Residual Gas Analyzer (RGA) 152 may be used to ensure the absence of bromide gases prior to opening the chamber 26'. FIG. 2 also shows that a tin bromide recovery system 154 may be used to recover the relatively volatile tin bromide and maintain a suitable gas pressure in the chamber 26'. As shown, the recovery system 154 may include a pair of gate valves 156a,b spaced apart to establish an isolation chamber 158, a tin bromide reservoir 160 and a cooling device 162, e.g. Peltier device to solidify the tin bromide. The two-valve system 154 may be differentially pumped and include scrubbers (not shown) to allow the reservoir 160 to be emptied without breaking chamber 26' pressure or releasing hazardous gases, e.g. bromides.

FIG. 2 illustrates the generation of tin bromide, e.g. $SnBr_2$ or $SnBr_4$, droplets for irradiation by a laser beam 164, which as described above may be a $CO_2$ laser source producing radiation at 10.6 μm. Irradiation of the tin bromide creates a plasma which may include tin ions and bromide ions, and in some cases a portion of the droplet will be evaporated (but not ionized). This unused gaseous portion may be evacuated from the chamber via pumping and thus the unused portion of the droplet may not contribute to optical surface contamination. Tin ions formed in the plasma may reach the surface of an optical element, e.g. the surface of a collector mirror and deposit on the surface as metallic tin. Bromide ions, on the other hand, will be available and may etch tin, e.g. react with and remove tin deposits from the surface. The EUV light source may also include one or more heaters (not shown) to heat Tin that has deposited on the surface of an optical element, e.g. collector, laser input window, metrology window, to a temperature greater than 150° C. to increase a rate of chemical reaction between the deposited Tin and the etchant, e.g. bromide. For example, the heater may be an ohmic heater, a radiative heater, a radio-frequency heater and/or a microwave heater.

Thus, the use of tin bromide, may provide; a good coupling between tin and the laser, e.g. $CO_2$ laser source at 10.6 μm, resulting in a good conversion efficiency, reduced operating temperature for the droplet generator, e.g. $SnBr_4$ as compared to tin, an inherent debris mitigation mechanism (bromide etching), and may in some cases be used as a mass limited source material to decrease debris and material consumption.

Figure 3:
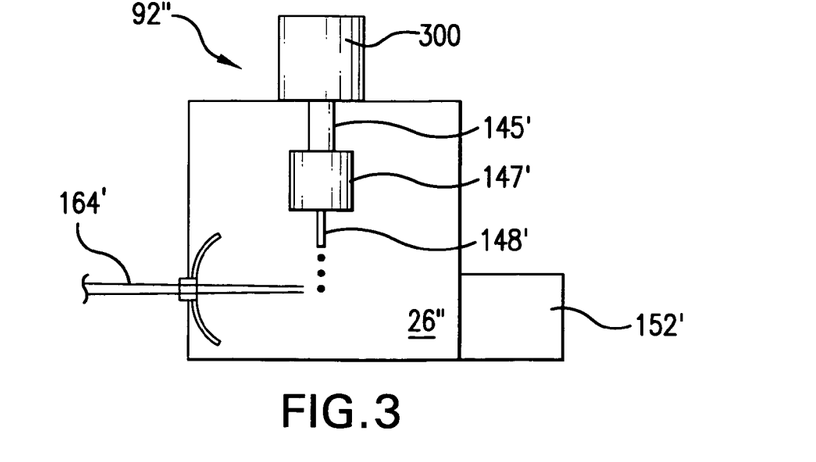
FIG. 3 shows a schematic, not to scale, view of a droplet generator system for creating droplets of a source material such as $SnH_4$.

FIG. 3 shows in greater detail a target delivery mechanism 92" for delivering target(s) of source material having, for example, liquid $SnH_4$ into a chamber 26" for irradiation therein to produce a plasma. For example, for liquid $SnH_4$ which boils at about minus 52 degrees Celsius, the mechanism 92" may function to cool $SnH_4$ to a range of about minus 55 to minus 70 degrees Celsius, and generate a stream of $SnBr_4$ droplets.

For the specific embodiment shown in FIG. 3, the target delivery mechanism 92" may include a cryogenic reservoir 300 holding a source material, e.g. tin hydride ($SnH_4$), in a liquid state and under pressure, e.g. using pressurized gas, e.g. inert gas, e.g. Argon gas. For example, nitrogen gas from a liquid nitrogen dewar may be circulated around the reservoir 300 to maintain the $SnH_4$ at a temperature of about minus 55 to minus 70 degrees Celsius. Other gases may be used to cool the $SnH_4$ such as Helium. Alternatively, or in addition thereto, a Peltier cooling system may be used to cool the $SnH_4$. The argon gas pressure may be used to pass the source material through a set of filters 145' which may be for example, fifteen and seven microns, respectively, which trap solid inclusions, e.g. solid compounds like oxides, nitrides; metal impurities and so on, of seven microns and larger. From the filters 145, the source material may pass through an open/close valve 147' to a dispenser 148'. For the mechanism 92", one or more modulating or non-modulating source material dispenser(s) as described above may be used. For the arrangement shown in FIG. 3, the chamber 26" may include a scrubber (not shown), a may be differentially pumped. As shown, a differentially pumped and gate valve isolated Residual Gas Analyzer (RGA) 152' may be used to ensure the absence of gases prior to opening the chamber 26'.

FIG. 3 illustrates the generation of $SnH_4$, droplets for irradiation by a laser beam 164', which as described above may be a $CO_2$ laser source producing radiation at 10.6 μm. Irradiation of the $SnH_4$ creates a plasma which may include tin ions and hydrogen ions, and in some cases a portion of the droplet will be evaporated (but not ionized). This unused gaseous portion may be evacuated from the chamber via pumping and thus the unused portion of the droplet may not contribute to optical surface contamination. Tin ions formed in the plasma may reach the surface of an optical element, e.g. the surface of a collector mirror and deposit on the surface as metallic tin. Hydrogen ions, on the other hand, will be available and may etch tin, e.g. react with and remove tin deposits from the surface. The EUV light source may also include one or more heaters (not shown) to heat Tin that has deposited on the surface of an optical element, e.g. collector, laser input window, metrology window, to a temperature greater than 150° C. to increase a rate of chemical reaction between the deposited Tin and the etchant, e.g. hydrogen. For example, the heater may be an ohmic heater, a radiative heater, a radio-frequency heater and/or a microwave heater.

Thus, the use of $SnH_4$, may provide a good coupling between tin and the laser, e.g. $CO_2$ laser source at 10.6 μm, resulting in a good conversion efficiency, reduced operating temperature for the droplet generator, e.g. $SnH_4$ as compared to tin, an inherent debris mitigation mechanism (hydrogen etching), and may in some cases be used as a mass limited source material to decrease debris and material consumption.

Figure 4:
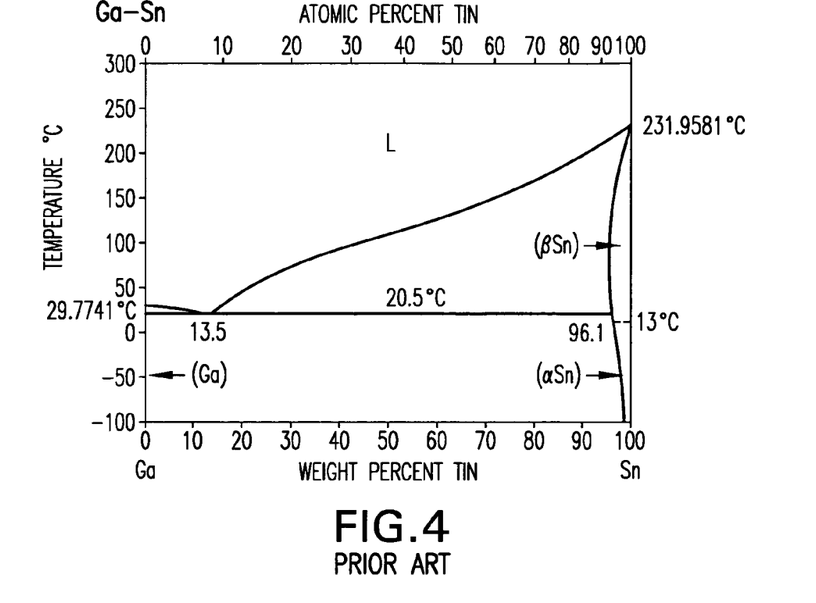
FIG. 4 shows a prior art, binary constitution diagram for Gallium Tin alloys.

FIG. 4 shows a binary constitution diagram for Gallium Tin alloys. As shown, alloys of Gallium Tin have a melting point lower than pure tin and alloys are available which can be processed below 150 degrees C. allowing the use of piezoelectric actuators, and alloys are available that are liquid at room temperature allowing these alloys to be processed without heating the source material. Gallium debris, like tin debris, which deposits on optical surfaces such as the collector material may be, for example, using one or more of the following etchants; HBr, HI, $Br_2$, $Cl_2$, HCl, $H_2$. Heat may be used to accelerate etching of both gallium and tin. For example, an HBr etchant may be used with heating of the optical component surface to a temperature in the range of 300-400 degrees Celsius. Use of the Eutectic alloy having a composition of about 12.5 weight percent Sn, balance Ga may be preferable in some applications due to its low melting point and compatibility (e.g. corrosiveness) with source material dispenser materials.

Thus, the use of Gallium-Tin alloys may provide a good coupling between tin and the laser, e.g. $CO_2$ laser source at 10.6 μm, resulting in a good conversion efficiency, reduced operating temperature for the droplet generator, a debris mitigation mechanism, e.g. etching of both tin and Gallium, and in some cases be used as a mass limited source material to decrease debris and material consumption.

Figure 5:
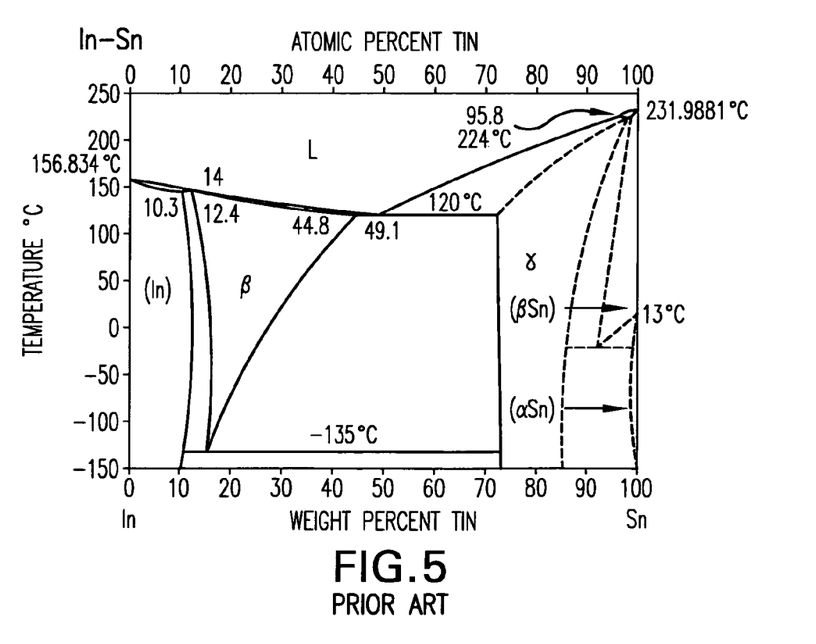
FIG. 5 shows a prior art, binary constitution diagram for Indium Tin alloys.

FIG. 5 shows a binary constitution diagram for Indium Tin alloys. As shown, alloys of Indium Tin have a melting point lower than pure tin and alloys are available which can be processed below 150 degrees C. allowing the use of piezoelectric actuators. Indium debris, like tin debris, which deposits on optical surfaces such as the collector material may be, for example, using one or more of the following etchants; HBr, HI, $Br_2$, $Cl_2$, HCl, $H_2$. Heat may be used to accelerate etching of both indium and tin. For example, an HBr etchant may be used with heating of the optical component surface to a temperature in the range of 300-400 degrees Celsius. Use of the Eutectic alloy having a composition of about 49.1 weight percent Sn, balance In may be preferable in some applications due to its low melting point and compatibility (e.g. corrosiveness) with source material dispenser materials.

Thus, the use of Indium-Tin alloys may provide; a good coupling between tin and the laser, e.g. $CO_2$ laser source at 10.6 μm, resulting in a good conversion efficiency, reduced operating temperature for the droplet generator, a debris mitigation mechanism, e.g. etching of both tin and Indium, and in some cases be used as a mass limited source material to decrease debris and material consumption.

Figure 6:
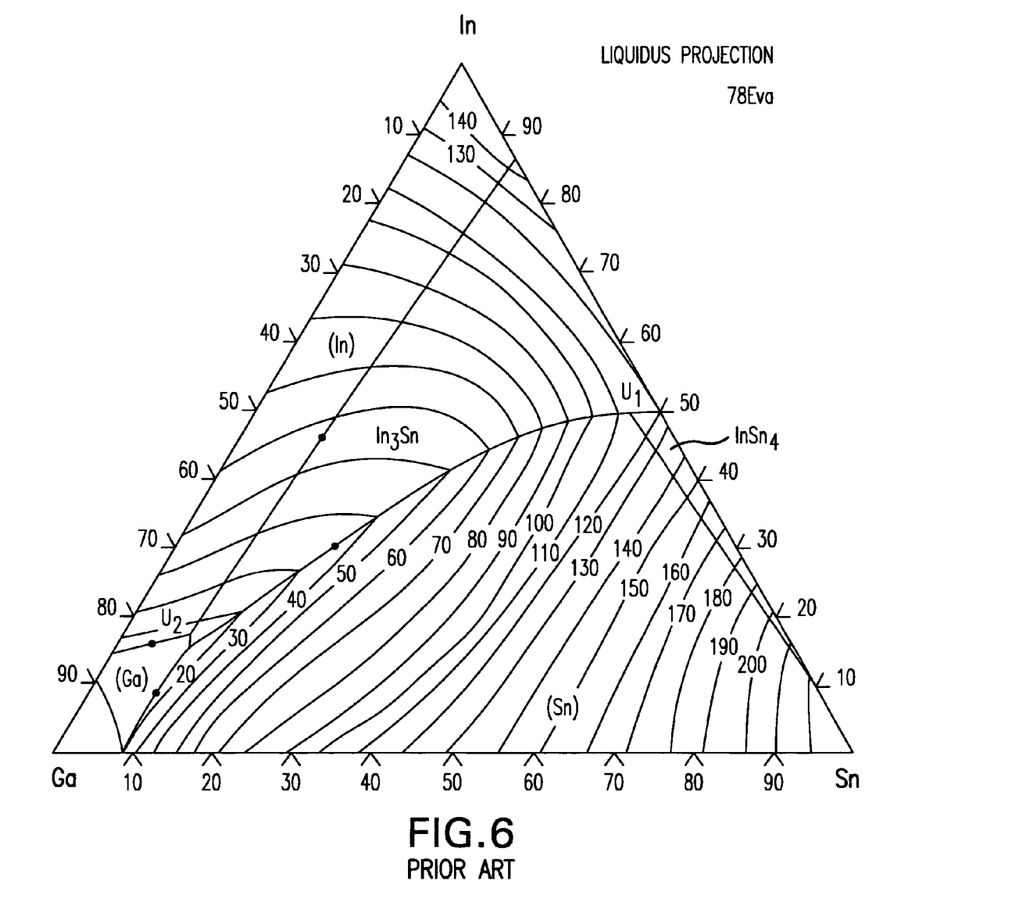
FIG. 6 shows a prior art, ternary constitution diagram for Gallium Tin Indium alloys.

FIG. 6 shows a prior art, ternary, liquidus projection, constitution diagram of for Gallium Tin Indium alloys. As shown, alloys of Indium Gallium Tin are available having a melting point lower than pure tin, alloys are available which can be processed below 150 degrees C. allowing the use of piezoelectric actuators, and alloys are available that are liquid at room temperature allowing these alloys to be processed without heating the source material.

As indicated above, both Gallium and Indium debris, like tin debris, which deposits on optical surfaces such as the collector material may be, for example, using one or more of the following etchants; HBr, HI, $I_2$, $Br_2$, $Cl_2$, HCl, $H_2$. Heat may be used to accelerate etching of gallium, indium and tin. For example, an HBr etchant may be used with heating of the optical component surface to a temperature in the range of 300-400 degrees Celsius. Use of the an alloy having a composition of about 16+/−3 weight percent Sn, 22+/−3 weight percent In, balance Ga may be preferable in some applications due to its low melting point and compatibility (e.g. corrosiveness) with source material dispenser materials.

Thus, the use of Gallium-Tin-Indium alloys may provide a good coupling between tin and the laser, e.g. $CO_2$ laser source at 10.6 μm, resulting in a good conversion efficiency, reduced operating temperature for the droplet generator, a debris mitigation mechanism, e.g. etching of both tin and Gallium, and in some cases be used as a mass limited source material to decrease debris and material consumption.

As used herein, the term "metal" and its derivatives includes all elements of the periodic table of elements except: Hydrogen, Helium, Carbon, Nitrogen, Oxygen, Fluorine, Neon, Phosphorus, Sulfur, Chlorine, Argon, Selenium, Bromine, Krypton, Iodine, Xenon and Radon.

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art.

We claim:

1. An EUV light source, said source comprising:
   at least one optical element having a surface;
   a laser source generating a laser beam; and
   a source material irradiated by said laser beam to form a plasma and emit EUV light, said source material consisting essentially of a tin compound and generating tin debris by plasma formation which deposits on at least one optical element, wherein said tin compound includes an element effective in etching deposited tin from said surface; and
   a heater to heat tin deposits on said element surface to a temperature greater than 150° C. to increase a rate of chemical reaction between said deposited tin and the etchant.

2. An EUV light source as recited in claim 1 wherein said optical element is a multi-layer mirror.

3. An EUV light source as recited in claim 1 wherein said tin compound is $SnBr_4$.

4. An EUV light source as recited in claim 1 wherein said tin compound is $SnBr_2$.

5. An EUV light source as recited in claim 1 wherein said tin compound is $SnH_4$.

6. An EUV light source as recited in claim 1 wherein said optical element is selected from the group of elements consisting of a collector, a laser input window and a metrology window.

7. An EUV light source as recited in claim 1 wherein said heater is selected from the group of heaters consisting of an ohmic heater, a radiative heater, a radio-frequency heater and a microwave heater.

8. An EUV light source as recited in claim 1 further comprising a droplet generator system for creating droplets of source material.

9. An EUV light source as recited in claim 8 wherein said system heats said source material to a temperature above room temperature.

10. An EUV light source as recited in claim 9 wherein said tin compound is $SnBr_4$ and said temperature is above 35 degrees C.

11. An EUV light source as recited in claim 9 wherein said tin compound is $SnBr_2$ and said temperature is above 216 degrees C.

12. An EUV light source as recited in claim 8 wherein said system cools said source material to a temperature below room temperature.

13. An EUV light source as recited in claim 12 wherein said tin compound is $SnH_4$ and said temperature is below minus 52 degrees C.

14. An EUV light source as recited in claim 1 wherein said laser source comprises a $CO_2$ laser source.

15. An EUV light source as recited in claim 14 wherein said laser source produces radiation having a wavelength of about 10.6 μm.

16. An EUV light source said source comprising:
   a source material comprising at least one tin bromide.
   a heater for heating said source material above the melting point of said tin bromide;
   a $CO_2$ laser source generating a laser beam for irradiating said liquid source material to produce a plasma therefrom and emit EUV radiation;
   at least one optical element having a surface; and
   a heater to heat tin deposits on said element surface to a temperature greater than 150° C. to increase a rate of chemical reaction between said deposited tin and the bromide.

17. An EUV light source as recited in claim 16 wherein said source material comprises $SnBr_2$.

18. An EUV light source as recited in claim 16 wherein said source material comprises $SnBr_4$.

19. An EUV light source, said source comprising:
   a source material comprising $SnH_4$,
   a cooling system for cooling said source material below the boiling point of $SnH_4$; and
   a $CO_2$ laser source generating a laser beam for irradiating said liquid source material to produce a plasma therefrom and emit EUV radiation.

20. An EUV light source as recited in claim 19 wherein said cooling system uses Nitrogen to cool said source material.

21. An EUV light source, said source comprising:
   an etchant;
   a laser source generating a laser beam;
   a molten source material irradiated by said laser beam to form a plasma and emit EUV light, said source material comprising tin and at least one other metal, said source material having a melting point lower than pure tin;
   at least one optical element having a surface; and a heater to heat tin deposits on said element surface to a temperature greater than 150° C. to increase a rate of chemical reaction between said deposited tin and the etchant.

22. An EUV light source as recited in claim 21 wherein said molten source material consists essentially of metals.

23. An EUV light source as recited in claim 21 wherein said molten source material comprises Gallium.

24. An EUV light source as recited in claim 21 wherein said molten source material comprises Indium.

25. An EUV light source as recited in claim 21 wherein said molten source material comprises Gallium and Indium.

26. An EUV light source as recited in claim 21 wherein said molten source material comprises a eutectic tin alloy.

27. An EUV light source as recited in claim 21 wherein said laser source comprises a $CO_2$ laser source producing radiation having a wavelength of about 10.6 μm.

28. An EUV light source as recited in claim 21 wherein said optical element is selected from the group of elements consisting of a collector, a laser input window and a metrology window.

29. An EUV light source as recited in claim 28 further comprising a droplet generator system for creating droplets of source material.

30. An EUV light source as recited in claim 28 wherein said reactant is selected from the group of reactants consisting of HBr, HI, $I_2$, $Br_2$, $Cl_2$, HCl, $H_2$ and combinations thereof.

31. An EUV light source as recited in claim 21 wherein said source material melting point is lower than 150° C.

32. An EUV light source as recited in claim 21 wherein said source material comprises tin in the range of 13 to 19 percent by weight, Indium in the range of 19 to 25 percent by weight and Gallium in the range of 59 to 65 percent by weight.

* * * * *